(12) United States Patent
Blankley, Jr. et al.

(10) Patent No.: US 11,300,442 B2
(45) Date of Patent: Apr. 12, 2022

(54) WEIGHING APPARATUS WITH ALIGNMENT OF ACCELEROMETER COORDINATE SYSTEM AND LOAD CELL COORDINATE SYSTEM AND RELATED METHOD

(71) Applicant: ILLINOIS TOOL WORKS INC., Glenview, IL (US)

(72) Inventors: Randy L. Blankley, Jr., Springfield, OH (US); Juan C. Guzman, Dayton, OH (US); Hung B. Nguyen, Lebanon, OH (US); Randall L. Redman, Beavercreek, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 140 days.

(21) Appl. No.: 16/784,427

(22) Filed: Feb. 7, 2020

(65) Prior Publication Data
US 2021/0247229 A1    Aug. 12, 2021

(51) Int. Cl.
*G01G 23/36* (2006.01)
*G01G 3/14* (2006.01)

(52) U.S. Cl.
CPC ......... *G01G 23/363* (2013.01); *G01G 3/1414* (2013.01)

(58) Field of Classification Search
CPC ...... G01G 3/1414; G01G 21/23; G01G 21/28; G01G 23/363; G01G 23/01; G01G 23/015
See application file for complete search history.

(56) References Cited

U.S. PATENT DOCUMENTS

| | | | |
|---|---|---|---|
| 3,463,258 A | 8/1969 | Meier | |
| 3,713,333 A | 1/1973 | MacGeorge | |
| 4,438,823 A | 3/1984 | Hussels | |
| 4,494,620 A | 1/1985 | Knothe | |
| 4,907,179 A | 3/1990 | Oldendorf | |
| 4,913,248 A | 4/1990 | Zakai | |
| 4,971,177 A * | 11/1990 | Nojiri | G01G 19/4144 177/245 |
| 5,050,034 A | 9/1991 | Hegner | |
| 5,428,219 A | 6/1995 | Cwalinski | |
| 5,623,128 A * | 4/1997 | Grimm | G01G 3/1406 177/211 |
| 5,646,376 A | 7/1997 | Kroll | |

(Continued)

FOREIGN PATENT DOCUMENTS

| | | |
|---|---|---|
| CN | 101441102 | 5/2009 |
| EP | 0407705 | 1/1991 |

(Continued)

*Primary Examiner* — Randy W Gibson
(74) *Attorney, Agent, or Firm* — Thompson Hine LLP (57) ABSTRACT

A weighing apparatus includes a load cell assembly with an elongated load cell body including a first three dimensional coordinate orientation defined by a first X-axis, a first Y-axis and a first Z-axis. An accelerometer unit is operatively connected to the elongated load cell body and having a second three-dimensional coordinate orientation defined by a second X-axis, a second Y-axis and a second Z-axis. A memory unit is mounted on the elongated load cell body, the memory unit storing data for aligning the second three-dimensional coordinate orientation of the accelerometer unit with the first three-dimensional coordinate orientation of the elongated load cell body.

20 Claims, 7 Drawing Sheets

(56) References Cited

U.S. PATENT DOCUMENTS

| | | | |
|---|---|---|---|
| 5,717,167 A | 2/1998 | Filing | |
| 5,750,937 A * | 5/1998 | Johnson | G01G 23/3707 |
| | | | 177/199 |
| 5,929,389 A | 7/1999 | Keuper | |
| 5,992,032 A | 11/1999 | Chiang | |
| 6,137,065 A | 10/2000 | Zefira | |
| 7,761,258 B2 | 7/2010 | Brown | |
| 9,417,116 B2 | 8/2016 | Bishop | |
| 2003/0085060 A1 | 5/2003 | Becker | |
| 2008/0264141 A1 | 10/2008 | Kenmochi | |
| 2010/0289658 A1 | 11/2010 | Brown | |
| 2010/0300215 A1 | 12/2010 | Eilersen | |
| 2011/0119028 A1* | 5/2011 | Bishop | G01G 23/002 |
| | | | 702/173 |
| 2020/0173839 A1* | 6/2020 | Wu | G01G 23/002 |

FOREIGN PATENT DOCUMENTS

| | | |
|---|---|---|
| EP | 1695048 B1 | 8/2006 |
| EP | 1985977 | 10/2008 |
| GB | 2127154 | 4/1984 |
| JP | 58115327 | 7/1983 |
| JP | 2001255216 | 9/2001 |
| JP | 2007225366 | 9/2007 |
| WO | WO 2004102134 | 11/2004 |
| WO | WO 2005059488 A1 | 6/2005 |

* cited by examiner

WEIGHING APPARATUS WITH ALIGNMENT OF ACCELEROMETER COORDINATE SYSTEM AND LOAD CELL COORDINATE SYSTEM AND RELATED METHOD

TECHNICAL FIELD

This application relates generally to weighing apparatus and, more particularly, to weighing scales (such as, although not exclusively, weighing scales for retail stores) and the effects on measured weight when the weighing scale is inclined from the horizontal.

BACKGROUND

Weighing scales are widely used to accurately measure the weight of goods so that an appropriate price may be assigned to the specific measured weight of the goods. Modern weighing scales in retail stores and other venues that are required to accurately measure the weight of goods commonly use load cells to measure the weight of the goods. Load cells of weighing scales typically comprise one or more strain gauges that deform when an applied load is placed upon the scale. As the strain gauges deform, the gauges send out an initial electrical signal corresponding to an uncompensated weight value, which can be referred to as the raw output or raw weight value.

If at any time the weighing scale is tilted off horizontal, the raw value of weight of an applied load measured by the load cell becomes lighter than the actual weight if the applied load was measured on the horizontal. As such, weighing scales are commonly placed on flat surfaces and/or have mechanisms such as adjustable feet to level the scale if needed. However, despite being nominally located on flat surfaces, weighing scales in busy stores are often moved around and may often be knocked either deliberately or accidentally. For purposes of nomenclature and ease of understanding, terms such as 'horizontal' or 'level to the horizontal' throughout this application refer to the inclination level where a load cell measures the true weight of the applied load.

Weighing scales are often sold with a specified weighing accuracy and are often required by local or national laws to be accurate to within a specific tolerance. This can pose a problem as the errors in weight measurement when a scale is tilted can put a weighing scale that is nominally accurate when measuring on the horizontal out of tolerance if it is tilted off the horizontal. Furthermore, it is also commercially important for the retailer to keep the weighing scale as level as possible to the horizontal when performing a weight measurement as a lighter weight reading of goods from the load cell would mean that the customer would be paying a cheaper price for the goods than the true price if the goods were weighed on the horizontal.

One common technique to compensate for tilt is to use an inclinometer to measure the inclination of the load cell in two different axes in the plane of the horizontal and then calculate from both of these inclination values a correction factor to compensate for the error in the raw weight.

U.S. Pat. No. 6,137,065 describes an inclinometer either mounted next to or integrated with a load cell to compensate for the effects of tilt. In this document, when the inclinometer is integrated with the load cell, the load cell outputs an inclination corrected value. When the inclinometer is mounted on a base next to the load cell, the inclination information is output to a display that indicates which legs of the base unit of the weighing scale should be adjusted to bring the scale into a horizontal level.

U.S. Pat. No. 9,417,116, incorporated herein by reference, describes a method of calibrating a weighing apparatus including a load cell, an inclinometer located in a defined position with respect to the load cell and a processor. The method involves the steps of: applying a first mass to the load cell to measure a weight of the first mass; providing to the processor a first value associated with the weight of the first mass measured with the load cell at a first inclination value; measuring with the load cell at a second inclination from a horizontal level a second value associated with the weight of the first mass and providing the second value to the processor; measuring with the inclinometer a second inclination value associated with the load cell at the second inclination and providing the second inclination value to the processor; modifying, in the processor, the second value associated with the weight of the first mass in accordance with at least a first inclination relationship and the second inclination value to provide a modified second value; calculating, in the processor; an error parameter based at least upon: i) a comparison of the first value associated with the weight of the first mass, and the modified second value; and, ii) an error relationship between weight and load cell inclination; and using the error parameter to correct further measurements by the load cell of further masses after the weighing apparatus has been calibrated to produce a tilt compensated weight value of the further masses. This method is carried out after the load cell is finally installed in the weighing apparatus.

It would be desirable to also provide a calibration of load cells that facilitates installation of the load cell into any one of multiple different weighing apparatus.

SUMMARY

In one aspect, a weighing apparatus includes a load cell assembly with an elongated load cell body including a first three dimensional coordinate orientation defined by a first X-axis, a first Y-axis and a first Z-axis, the elongated load cell body including a mount end for supporting the elongated load cell body and a load end for applying a load to the elongated load cell body, the elongated load cell body carrying a set of strain gauges for providing electrical outputs corresponding to load applied to the load end of the elongated load cell body. An accelerometer unit is connected to the elongated load cell body and has a second three dimensional coordinate orientation defined by a second X-axis, a second Y-axis and a second Z-axis, wherein the second X-axis is offset from the first X-axis, the second Y-axis is offset from the first Y-axis and the second Z-axis is offset from the first Z-axis. A memory unit is mounted on the elongated load cell body, the memory unit storing a rotation matrix M that defines data for aligning the second three-dimensional coordinate orientation of the accelerometer unit with the first three-dimensional coordinate orientation of the elongated load cell body.

In another aspect, a method of producing a weighing apparatus involves: (a) utilizing a load cell body including a first three dimensional coordinate orientation defined by a first X-axis, a first Y-axis and a first Z-axis, the load cell body including: (i) a mount end for supporting the load cell body and a load end for applying a load to the load cell body, the load cell body carrying a set of strain gauges for providing electrical outputs corresponding to load applied to the load end of the load cell body, (ii) an accelerometer unit operatively connected to the load cell body and having a second three dimensional coordinate orientation defined by a second X-axis, a second Y-axis and a second Z-axis, wherein the second X-axis is offset from the first X-axis, the second Y-axis is offset from the first Y-axis and the second Z-axis is offset from the first Z-axis, and (iii) a memory unit mounted on the load cell body; (b) determining an offset of the second three dimensional coordinate orientation from the first three dimensional coordinate orientation by collecting accelerometer output values when the load cell body is in a plurality of known angular orientations; and (c) storing data representing the offset in the memory unit.

In a further aspect, a weighing apparatus includes a load cell body including a first three dimensional coordinate orientation defined by a first X-axis, a first Y-axis and a first Z-axis, the load cell body including a mount end for supporting the load cell body and a load end for applying a load to the load cell body. An accelerometer unit is connected in a fixed position relative to the load cell body and having a second three dimensional coordinate orientation defined by a second X-axis, a second Y-axis and a second Z-axis, wherein the second X-axis is offset from the first X-axis, the second Y-axis is offset from the first Y-axis and the second Z-axis is offset from the first Z-axis. A memory unit is associated with the weighing apparatus and stores data for aligning the second three-dimensional coordinate orientation of the accelerometer unit with the first three-dimensional coordinate orientation of the load cell body.

The details of one or more embodiments are set forth in the accompanying drawings and the description below. Other features, objects, and advantages will be apparent from the description and drawings, and from the claims.

DETAILED DESCRIPTION

Figure 1:
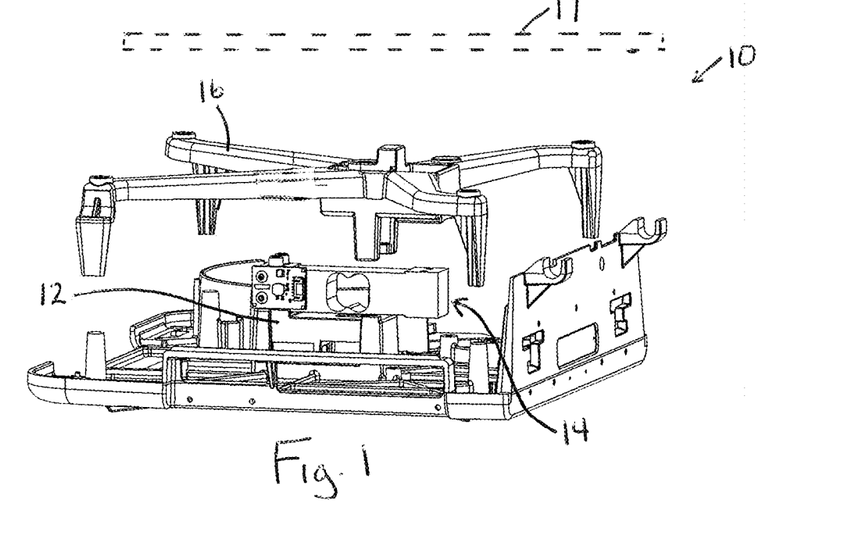
FIG. 1 is a perspective view of an exemplary weighing apparatus.
Figure 2:
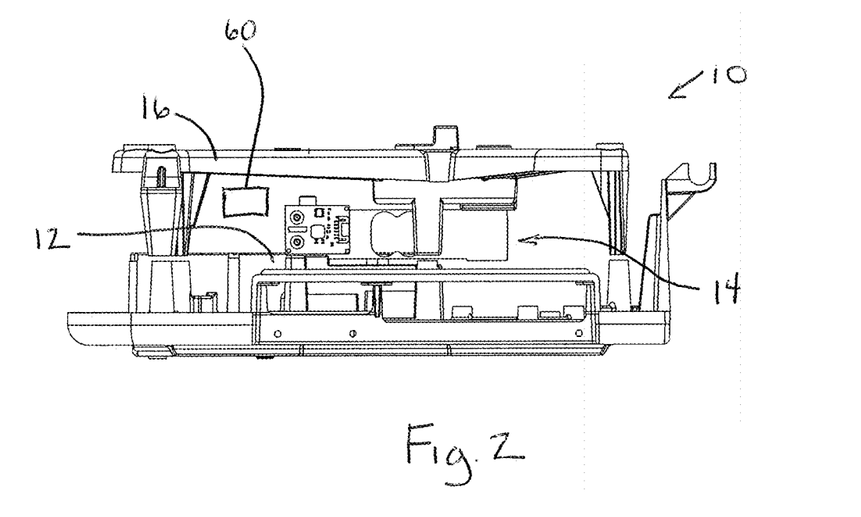
FIG. 2 is an elevation view of the weighing apparatus.

Referring to FIGS. 1 and 2, a weighing apparatus 10 is shown in and includes a base 12, a load cell assembly 14 and a weight distribution frame 16. The weight distribution frame 16 is shown separated/exploded in FIG. 1, and connected to the load cell body in FIG. 2. By way of example, the base 12 may be formed of metal or plastic, or combinations of the same, as can the weight distribution frame 16. A weigh platter 17 (shown schematically in FIG. 1) can be positioned on the weight distribution frame 16 for supporting food product during a weighing and pricing operation of the weighing apparatus.

Figure 3:
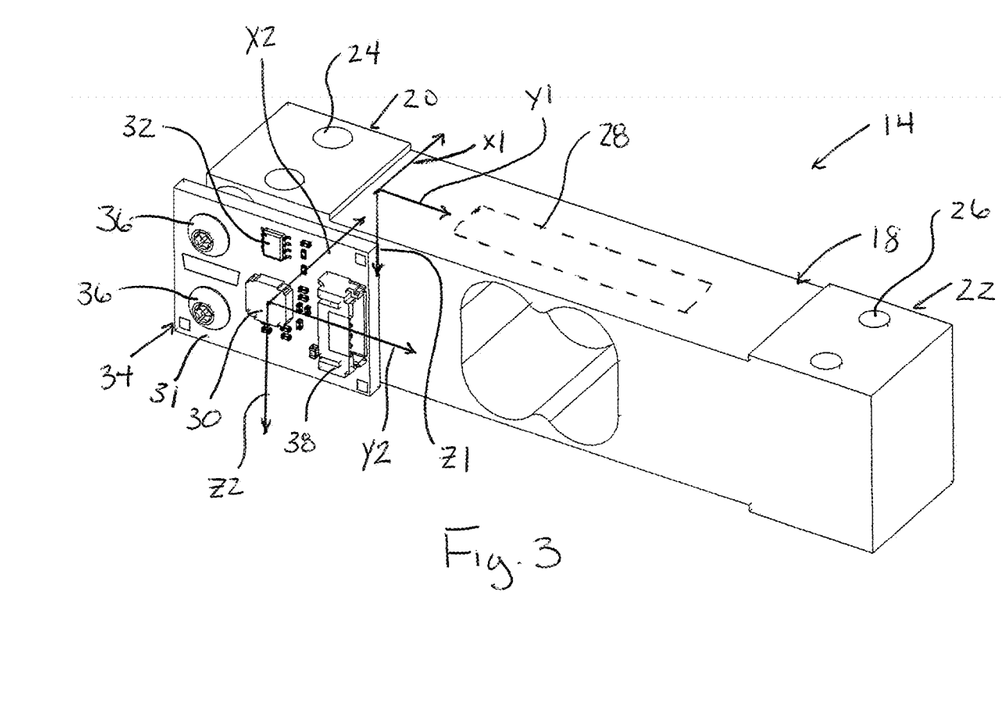
FIG. 3 is a perspective view of a load cell assembly with integrated accelerometer.
Figures 4A, 4B, 4C, 4D, 4E:
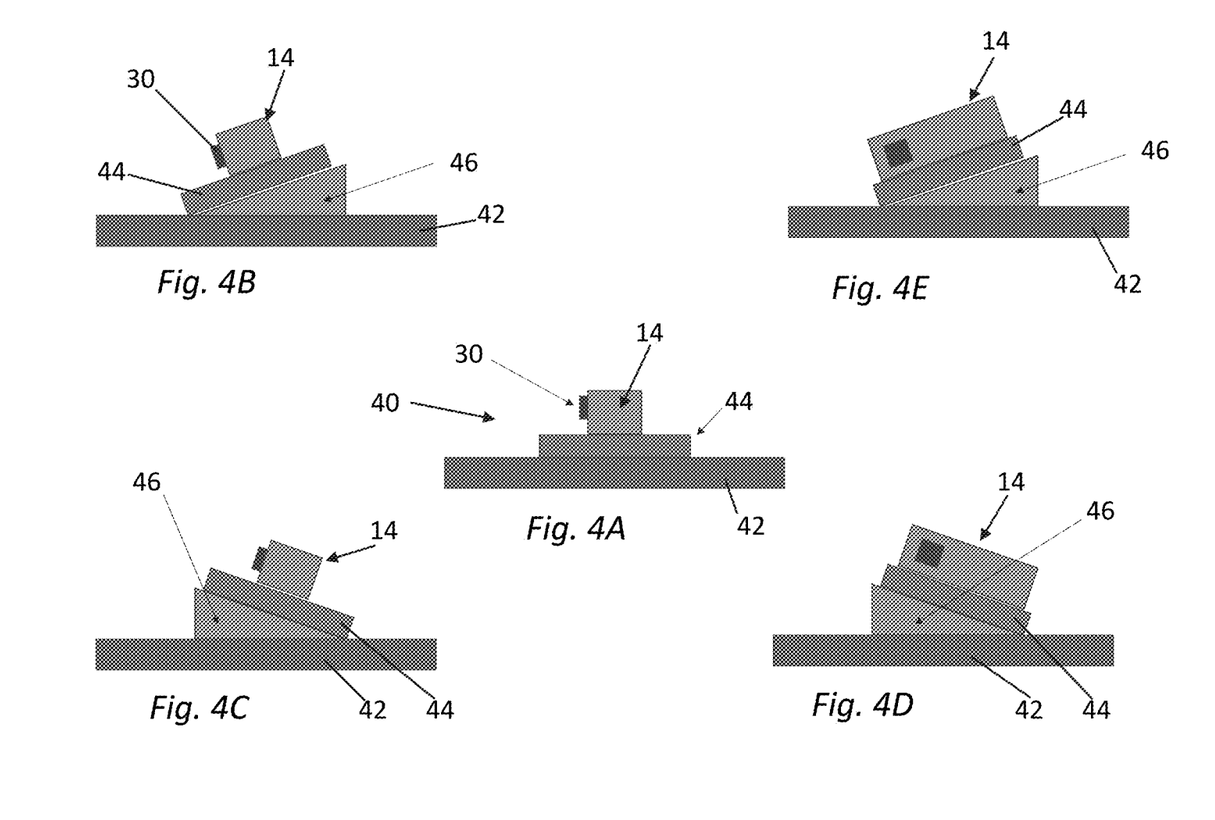
FIGS. 4A-4E show calibration rig configurations for calibrating the accelerometer.

As seen in FIG. 3, the load cell assembly 14 includes an elongated load cell body 18 with a mount end 20 for supporting the load cell and a load end 22 for applying a load to the elongated load cell body. The mount end includes fastener openings 24 for fixedly attaching the mount end to the base, and the load end includes fastener openings 26 for connecting the weight distribution frame to the load end. The elongated load cell body 18 carries a set of strain gauges (e.g., 28) for providing electrical outputs corresponding to load applied to the load end of the load cell body.

An accelerometer unit 30 is operatively connected to the elongated load cell body 14, along with a memory unit 32 (e.g., such as a flash memory unit). Here, both the accelerometer unit 30 and the memory unit 32 are operatively connected to the elongated load cell body 14 by way of mounting on a printed circuit board 31 (PCB) of a PCB assembly 34 that is, in turn, connected to the mount end 20 of the elongated load cell body (e.g., by way of fasteners 36 that engage in lateral openings at the mount end of the elongated load cell body). The printed circuit board assembly 34 also carries an electrical connector 38 with terminals enabling output of the indications/outputs of the accelerometer 30 and reading of data from the memory unit 32. The accelerometer unit is mounted at the mount end of the elongated load cell body such that the accelerometer unit orientation does not change during loading of the load end of the elongated load cell body.

The elongated load cell body 18 includes a three-dimensional coordinate orientation defined by the X1, Y1 and Z1 axes. The accelerometer unit 30 has a second three-dimensional coordinate orientation defined by the X2, Y2 and Z2 axes. Due to accelerometer variation (e.g. the alignment of X,Y,Z for a given accelerometer unit may not match the alignment X,Y,Z of another accelerometer unit, even though the accelerometer units are identical in type), PCB soldering variation, and mechanical mounting variation, the accelerometer coordinate orientation will not be perfectly aligned to the coordinate orientation of the elongated load cell body. In other words, the X2-axis is offset from the X1-axis, the Y2-axis is offset from the Y1-axis and the Z2-axis is offset from the Z1-axis. To account for this offset, the accelerometer is calibrated to the load cell body using a rig with fixed and known axis orientation.

Referring to FIGS. 4A-4E, an exemplary rig 40 and calibration process are depicted, where the rig includes a known horizontal support surface 42 (e.g., a levelled granite table) and flat plate 44 to which the load cell assembly 14 is mounted for the calibration process, as well as a predefined tilt producing unit 46 (e.g., here represented by a slanted block). By using the rig 40 and recording accelerometer output in the five depicted orientations (e.g., no tilt per FIG. 4A, negative five degrees Y tilt per FIG. 4B, positive five degrees Y tilt per FIG. 4C, negative five degrees X tilt per FIG. 4D and positive five degrees X tilt per FIG. 4E), a rotation matrix M can be constructed such that when the rotation matrix is applied to the accelerometer X, Y and Z axis outputs at level, producing alignment adjusted outputs X', Y' and Z', such that there is no tilt factor (relative to the elongated load cell body axes) present in either of the alignment adjusted X' or Y' outputs of the accelerometer. The accelerometer alignment adjusted Z' output will represent the g force applied. Such a matrix can be readily generated for any accelerometer and bring any accelerometer coordinate frame of reference into the load cell's coordinate frame of reference. This accelerometer alignment calibration is carried out for a load cell assembly before the load cell assembly is mounted to the base of the weighing apparatus. The resulting rotation matrix for a load cell assembly can be referred to as matrix M.

Figure 5:
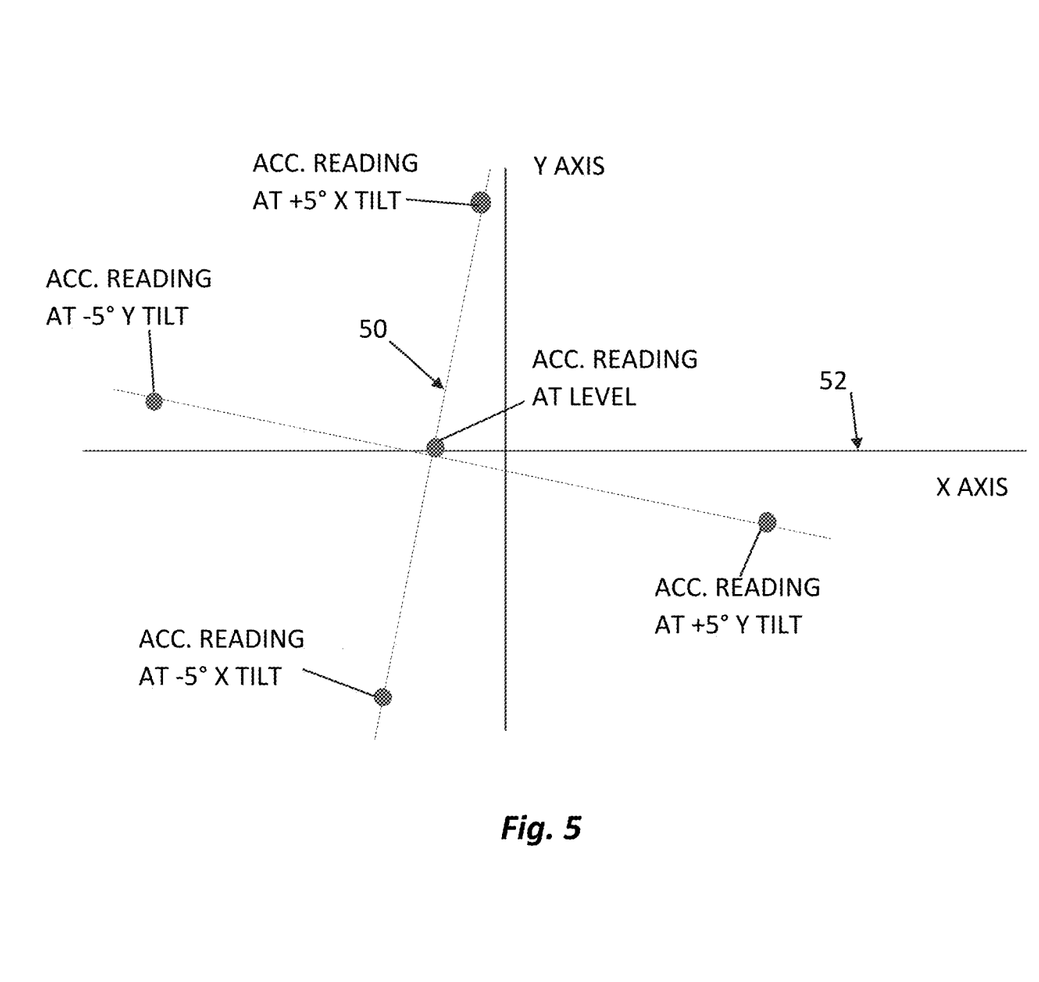
FIG. 5 shows a diagram of accelerometer coordinate frame relative to load cell body coordinate frame.

Referring to FIG. 5, an exemplary diagram of accelerometer data set at each of the five orientations of the test rig are shown. The rotation matrix M is constructed using mean squared error to bring the accelerometer coordinate frame 50 in line with the load cell coordinate frame 52. In the discussed example, the rig is calibrated for 10 degrees of total tilt in each axis, however, other variations are possible. Regardless of the total tilt, gain factors for each of the X and Y axis of the accelerometer can be computed. This is done by taking the accelerometer output at positive five (or other number if applicable) degrees tilt and at negative five (or other number if applicable) degrees tilt and computing the delta. This delta represents how much change in accelerometer output corresponds to ten (or other number if applicable) degrees of tilt. For the X and Y axis, these gain factors can be designated as XG and YG respectfully.

Notably, the rotation matrix M and gain factors XG and YG for the load cell assembly 14 are stored in the memory unit 32 of the load cell assembly 14. The weighing apparatus controller 60 (shown schematically in FIG. 2) is configured to utilize these stored values to calculate actual X and Y tilt of the load cell assembly 14 very accurately, as follows. The controller 60 may be connected to the connector 38 for this purpose. In addition, the controller 60 is also connected to the strain gauge outputs of the load cell (e.g., via an A/D converter).

The controller 60 is configured to retrieve the rotation matrix M from memory and to take the actual accelerometer outputs X, Y, Z and multiply them by the matrix M, to produce the alignment adjusted outputs X', Y', and Z'. Such a calculation is represented by Equation 1 below.

$$\begin{bmatrix} X \\ Y \\ Z \end{bmatrix} \begin{bmatrix} M_{11} & M_{12} & M_{13} \\ M_{21} & M_{22} & M_{23} \\ M_{31} & M_{32} & M_{33} \end{bmatrix} = \begin{bmatrix} X' \\ Y' \\ Z' \end{bmatrix} \quad (Eq. 1)$$

Actual X tilt of the load cell assembly, designated AX, can be calculated by Equation 2 below.

$$AX = XG \times \tan^{-1}\left(\frac{X'}{\sqrt{Y'^2 + Z'^2}}\right) \quad (Eq. 2)$$

Actual Y tilt of the load cell assembly, designate AY, can be calculated by Equation 3 below.

$$AY = YG \times \tan^{-1}\left(\frac{Y'}{\sqrt{X'^2 + Z'^2}}\right) \quad (Eq. 3)$$

Thus, the load cell assembly 14, with on-board accelerometer unit 30 and an on-board memory unit 32 storing the rotation matrix M and the gain factors XG and YG, provides an integrated package that is ready to install in any weighing apparatus that is configured to read and utilize the stored rotation matrix M and/or gain factors XG and YG to provide more accurate analysis of actual load cell tilt or offset from the horizontal.

Generally, the load cell outputs (i.e., the strain gauge outputs) are connected to an A/D circuit. Everything placed above the load cell that is not product is called dead load. This load is physically attached to the load cell is not removable. When reading the A/D counts and only dead load is present this is called scale zero, or Z. The dead load amount, or DL, may be a fixed known weight. DL is composed of the platter 17, the weight distribution frame 16, and two bolts that secure the frame 16 into the load cell body 14.

For out of level weight compensation, the load cell must be also be calibrated after the load cell assembly is attached in the weighing apparatus (e.g., after final assembly of the complete weighing apparatus). The load cell calibration can be carried out in a manner comparable to that described in U.S. Pat. No. 9,417,116. Thus, the controller 60 can also be configured to apply an electronic offset factor that is based upon the A/D converter reading at no load, and to correct for moment error.

Figure 7:
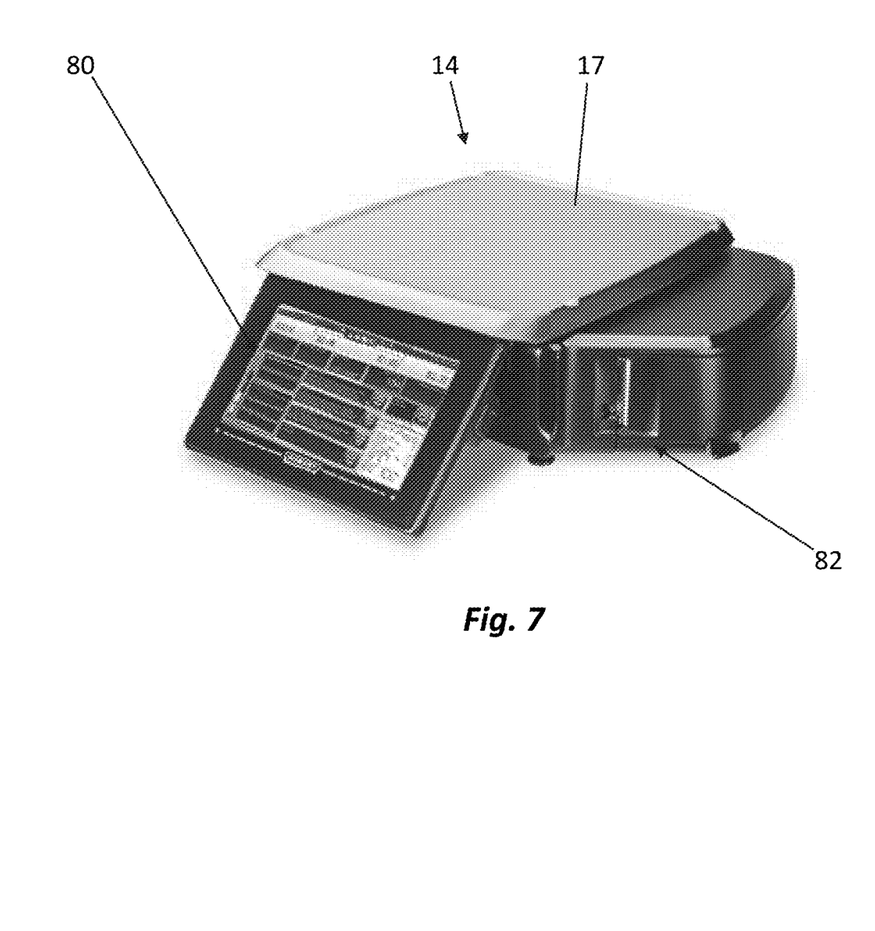
FIG. 7 shows an exemplary fully assembled weighing apparatus.

FIG. 7 shows an exemplary assembled food item weighing apparatus 10 including a user interface screen 80 (e.g., touch-screen interface) and a label printer 82. In a typical item weighing operation, an item is placed on the weigh platter 17, the operator identifies the item to the weighing apparatus (e.g., by inputting an item code via the user interface 80) and the scale controller weighs the item, prices the item (e.g., applying a price per unit weight tied to the item codes) and prints and outputs a pricing label for the item (e.g., with item name, weight, price etc.).

Figure 6A:
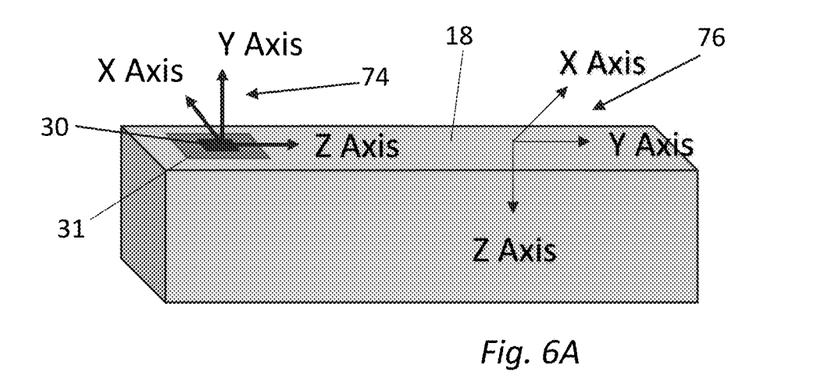
FIGS. 6A-6C show alternative mount configurations for the accelerometer unit.
Figure 6B:
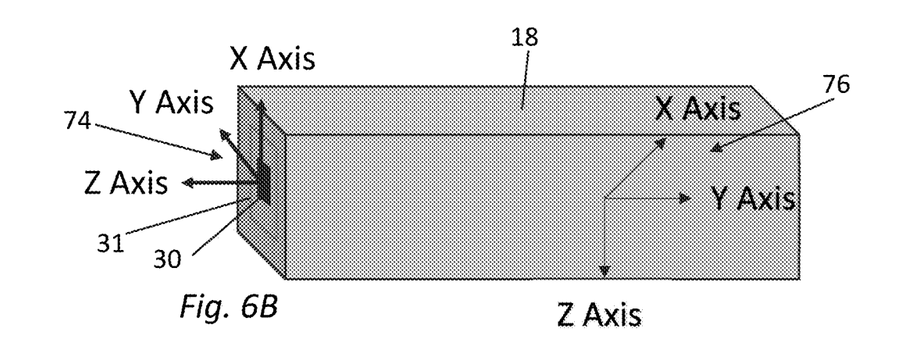
Figure 6C:
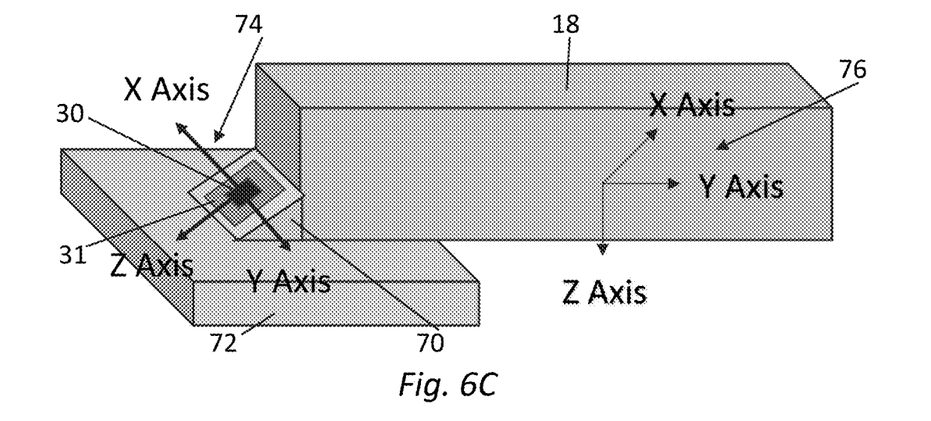

It is to be clearly understood that the above description is intended by way of illustration and example only, is not intended to be taken by way of limitation, and that other changes and modifications are possible. For example, although the illustrated embodiment depicts both the accelerometer unit and memory unit mounted on a common PCB that is in turn mounted to the load cell body, other variations are possible. The accelerometer, or even the PCB on which the accelerometer is mounted, does not have to be mounted directly to the load cell. The accelerometer or PCB could be mounted to a plate or any other structure affixed to the load cell, as long as the result is that accelerometer position is fixed relative to the load cell body (the accelerometer does not move relative to load cell body). FIGS. 6A and 6B show other exemplary mountings of the accelerometer unit 30 to the load cell body 18 via a PCB 31. FIG. 6C shows an exemplary mounting of the accelerometer unit 30 to a triangular block 70 and plate structure 72 that is associated with the load cell body. In some embodiments, the accelerometer unit could be mounted in a fixed manner to the same weighing apparatus base to which the load cell body is mounted, which would also assure maintaining of a fixed position of the accelerometer unit relative to the load cell body. Regardless of the mounting, use of an appropriately determined rotation matrix can be used to rotate the coordinate system 74 of the accelerometer unit into alignment with the coordinate system 76 of the load cell body. Moreover, the position of the memory unit relative to the load cell body does not need to fixed, and thus the operative connection of the memory unit to the load cell body could be a flexible or movable connection. Still other variations are possible.

What is claimed is:

1. A weighing apparatus, comprising:
a load cell assembly comprising:
an elongated load cell body including a first three-dimensional coordinate orientation defined by a first X-axis, a first Y-axis and a first Z-axis, the elongated load cell body including a mount end for supporting the elongated load cell body and a load end for applying a load to the elongated load cell body, the elongated load cell body carrying a set of strain gauges for providing electrical outputs corresponding to load applied to the load end of the elongated load cell body;
an accelerometer unit operatively connected to the elongated load cell body in a fixed position relative to the elongated load cell body, the accelerometer unit having a second three-dimensional coordinate orientation that is not aligned with the first three-dimensional coordinate orientation and that is defined by a second X-axis, a second Y-axis and a second Z-axis, wherein the second X-axis is offset from the first X-axis, the second Y-axis is offset from the first Y-axis and the second Z-axis is offset from the first Z-axis;

a memory unit operatively connected to the elongated load cell body, the memory unit storing a rotation matrix M that defines data for aligning the second three-dimensional coordinate orientation of the accelerometer unit with the first three-dimensional coordinate orientation of the elongated load cell body.

2. The weighing apparatus of claim 1, wherein the memory unit further stores an accelerometer gain factor XG corresponding to a predefined change in tilt about the second X-axis and an accelerometer gain factor YG corresponding to a predefined change in tilt about the second Y-axis.

3. The weighing apparatus of claim 2, further comprising:
a base;
wherein the mount end of the elongated load cell body is attached to and supported by the base, and the load end of the elongated load cell body is arranged in cantilever relative to the base;
a controller connected to (i) read data from the memory unit, (ii) receive outputs from the accelerometer and (iii) receive outputs from the set of strain gauges.

4. The weighing apparatus of claim 3, further comprising:
a weight distribution frame mounted to the load end of the accelerometer; and
a weigh platter supported on the weight distribution frame.

5. The weighing apparatus of claim 3, wherein the controller is configured to read the rotation matrix M from the memory unit, wherein the controller is configured such that, during weighing operations of the weighing apparatus, the controller receives X, Y and Z outputs from the accelerometer and multiplies those outputs by the rotating matrix M to define alignment adjusted outputs X', Y' and Z'.

6. The weighing apparatus of claim 5, wherein the controller is configured to calculate an X tilt and a Y tilt of the elongated load cell body based upon the gain factors XG and YG and the alignment adjusted outputs X' and Y'.

7. The weighing apparatus of claim 6, wherein the controller is configured to calculate the X tilt and the Y tilt of the elongated load cell body as follows:

$$AX = XG \times \tan^{-1}\left(\frac{X'}{\sqrt{Y'^2 + Z'^2}}\right)$$

and $$AY = YG \times \tan^{-1}\left(\frac{Y'}{\sqrt{X'^2 + Z'^2}}\right)$$

wherein AX is the X tilt and AY is the Y tilt.

8. The weighing apparatus of claim 1, wherein the accelerometer unit and the memory unit are both mounted on a printed circuit board, and the printed circuit board is mounted to the elongated load cell body.

9. The weighing apparatus of claim 1, wherein memory unit comprises a flash memory unit.

10. The weighing apparatus of claim 1, wherein the accelerometer unit is operatively connected at the mount end of the elongated load cell body.

11. A method of producing weighing apparatus, comprising:
utilizing load cell body including a first three-dimensional coordinate orientation defined by a first X-axis, a first Y-axis and a first Z-axis, the load cell body including:
a mount end for supporting the load cell body and a load end for applying a load to the load cell body, the load cell body carrying a set of strain gauges for providing electrical outputs corresponding to load applied to the load end of the load cell body;
providing an accelerometer unit in a fixed position relative to the load cell body and having a second three-dimensional coordinate orientation defined by a second X-axis, a second Y-axis and a second Z-axis, wherein the second X-axis is offset from the first X-axis, the second Y-axis is offset from the first Y-axis and the second Z-axis is offset from the first Z-axis;
providing a memory unit;
determining an offset of the second three-dimensional coordinate orientation from the first three-dimensional coordinate orientation by collecting accelerometer output values when the load cell body is in a plurality of known angular orientations; and
storing data representing the offset in the memory unit.

12. The method of claim 11, wherein the stored data includes a rotation matrix M that defines data for aligning the second three-dimensional coordinate orientation of the accelerometer unit with the first three-dimensional coordinate orientation of the load cell body.

13. The method of claim 12, further comprising:
calculating an accelerometer gain factor XG corresponding to a predefined change in tilt about the second X-axis and an accelerometer gain factor YG corresponding to a predefined change in tilt about the second Y-axis; and
storing the gain factors XG and YG in the memory unit.

14. The method of claim 11, wherein the accelerometer unit and the memory unit are operatively connected to the load cell body to provide a load cell assembly that is then mounted to a base of a weighing apparatus.

15. A weighing apparatus, comprising:
a load cell body including a first three-dimensional coordinate orientation defined by a first X-axis, a first Y-axis and a first Z-axis, the load cell body including a mount end for supporting the load cell body and a load end for applying a load to the load cell body;
an accelerometer unit connected in a fixed position relative to the load cell body and having a second three-dimensional coordinate orientation that is not aligned with the first three-dimensional coordinate orientation and that is defined by a second X-axis, a second Y-axis and a second Z-axis, wherein the second X-axis is offset from the first X-axis, the second Y-axis is offset from the first Y-axis and the second Z-axis is offset from the first Z-axis;
a memory unit associated with the weighing apparatus, the memory unit storing data for mathematically aligning the second three-dimensional coordinate orientation of the accelerometer unit with the first three-dimensional coordinate orientation of the load cell body.

16. The weighing apparatus of claim 15, wherein the memory unit further stores an accelerometer gain factor XG corresponding to a predefined change in tilt about the second X-axis and an accelerometer gain factor YG corresponding to a predefined change in tilt about the second Y-axis.

17. The weighing apparatus of claim 15, wherein the data for aligning the second three-dimensional coordinate orientation of the accelerometer unit with the first three-dimensional coordinate orientation of the load cell body takes the form of a rotation matrix.

18. The weighing apparatus of claim 15, wherein the accelerometer unit and the memory unit are both mounted on a printed circuit board, and the printed circuit board is mounted in a fixed position relative to the load cell body.

19. The weighing apparatus of claim 16, further comprising:
   a base;
   wherein the mount end of the load cell body is attached to and supported by the base, and the load end of the load cell body is arranged in cantilever relative to the base;
   a controller connected to (i) read data from the memory unit, (ii) receive outputs from the accelerometer and (iii) receive outputs from the set of strain gauges;
   wherein the controller is configured to read the data for aligning from the memory unit, wherein the controller is configured such that, during weighing operations of the weighing apparatus, the controller receives X, Y and Z outputs from the accelerometer and applies the data for aligning to the X, Y and Z outputs to define alignment adjusted outputs X', Y' and Z'.

20. The weighing apparatus of claim 19, wherein the controller is configured to calculate an X tilt and a Y tilt of the load cell body based upon the gain factors XG and YG and the alignment adjusted outputs X' and Y'.

* * * * *